United States Patent Office 3,769,268
Patented Oct. 30, 1973

3,769,268
SHORTSTOPPING FREE RADICAL POLYMERIZA-
TION OF VINYLIDENE MONOMERS
Paul J. George, West Richfield, Ohio, assignor to The
B. F. Goodrich Company, New York, N.Y.
No Drawing. Filed Apr. 14, 1972, Ser. No. 244,275
Int. Cl. C08f 3/30, 3/68
U.S. Cl. 260—89.5 A
11 Claims

ABSTRACT OF THE DISCLOSURE

The free radical polymerization of vinylidene monomers having a terminal $CH_2=C<$ grouping, with a catalyst system comprising an alkyl borane and a hydroperoxide of the formula ROOH in which R is hydrogen or a hydrocarbon radical, or a catalyst system of an alkyl borane and oxygen, is effectively terminated by adding a borohydride, such as $NaBH_4$, to the polymerization mixture.

BACKGROUND OF THE INVENTION

In the polymerization of vinylidene monomers having a terminal $CH_2=C<$ grouping with free radical catalysts, particularly those containing oxygen, it is generally necessary to stop the reaction after the polymerization has reached a predetermined state in order to obtain stable uniform polymers. Also, in many polymerization systems it is often desirable to stop the polymerization reaction short of complete conversion so that an effective agent of some kind must be employed to stop the reaction quickly without adversely affecting the polymerization product. This problem is particularly acute when employing the more active catalysts that give extremely fast polymerization rates and with, for example, vinyl chloride polymers that are subject to thermal degradation.

In the manufacture of polymers and copolymers of vinyl halides and vinylidene halides one of the most important aspects is reaction control during the entire course of the polymerization. This is related, directly or indirectly, to such things as demands on heat exchange equipment, "run-away" reactions, or formation of off-specification products. Accordingly, some means to terminate a polymerization such as this at any given time would be most desirable.

Heretofore, various shortstopping agents have been employed to terminate vinylidene monomer polymerizations. However, various agents will not work with all catalyst systems. Further, many of the shortstopping agents do not work fast enough and as a consequence, undesirable after polymerization takes place which adversely affects the properties of the polymer or copolymer.

While there are known shortstopping agents for use in vinylidene monomer polymerization reactions, wherein an alkylborane: hydroperoxide, or oxygen, co-catalyst system is employed, these known agents are not usually capable of allowing the reinitiation of the polymerization reaction. A desired quality for a shortstopping agent for use in such a system would be nonreactivity with the alkyl borane, thus permitting reinitiation of the polymerization reaction, if desired, and suitable stability and solubility in the polymerization reaction medium. This invention relates to new shortstopping agents meeting the above desired quality when employed in a vinylidene monomer polymerization reaction medium containing an alkyl borane: hydroperoxide, or oxygen co-catalyst system.

SUMMARY OF THE INVENTION

It has unexpectedly been found that in the polymerization of vinylidene monomers having a terminal $CH_2=C<$ grouping with a co-catalyst system comprising an alkyl borane and as a co-catalyst, a hydroperoxide or oxygen, the polymerization reaction is effectively stopped by the addition thereto of a borohydride having the following structural formula:

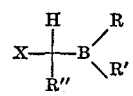

wherein X is an alkali metal and wherein each of R, R' and R'' may be hydrogen, phenyl, an alkyl group containing from 1 to 10 carbon atoms or an alkoxy radical containing from 1 to 10 carbon atoms.

DETAILED DESCRIPTION

The process of this invention is applicable to any polymerization system normally used to polymerize vinylidene monomers wherein an alkyl borane: hydroperoxide, or oxygen, co-catalyst system is employed including, for example, bulk, solution, aqueous suspension, aqueous emulsion, batch or continuous, and the like, as is well known to those skilled in the art.

The monomers which may be employed in the process of the present invention include any vinylidene monomer having at least one terminal $CH_2=C<$ grouping, including particularly the vinyl halides, such as vinyl chloride and vinylidene chloride; esters of acrylic acid such as methyl acrylate, ethyl acrylate, butyl acrylate, octyl acrylate, cyanoethyl acrylate, and the like; esters of methacrylic acid such as methyl methacrylate, butyl methacrylate, and the like; nitriles such as acrylonitrile and methacrylonitrile; acrylamides such as methyl acrylamide, N-methylol acrylamide, N-butoxy methacrylamide, and the like; vinyl ethers such as ethyl vinyl ether, chloroethyl vinyl ether, and the like; the vinyl ketones; styrene and styrene derivatives including α-methyl styrene, vinyl toluene, chlorostyrene, vinyl naphthalene, allyl and vinyl chloroacetate, vinyl acetate, vinyl pyridine, methyl-vinyl ketone; di-olefins including butadiene, isoprene, chloroprene, and the like, and mixtures of any of these types of monomers and other vinylidene monomers copolymerizable therewith including esters of maleic and fumaric acid and the like; and other vinylidene monomers of the types known to those skilled in the art. The present invention is particularly applicable to the polymerization of vinyl chloride alone or in admixture with one or more other vinylidene monomers copolymerizable therewith in amounts as great as about 80% by weight, based on the weight of the monomer mixture.

In the process of the present invention a catalyst: co-catalyst system is employed which comprises an alkyl borane as a catalyst, and as a co-catalyst either a hydroperoxide of the formula ROOH, in which R is hydrogen or a hydrocarbon radical, is used, or oxygen can be used in place of the hydroperoxide. The term "alkyl borane" has been accepted as the proper designation for an alkyl of boron. (See Boron Nomenclature in Chem. and Eng. News, vol. 32, p. 1442, 1954.)

The alkyl borane catalysts may be any one of the many alkyl boranes, such as triethyl borane, tripropyl borane, tributyl borane and other higher alkyl boranes. However, from the standpoint of economy and safety, both in the cost of the alkyl borane and in minimizing the hazards incident to the handling of alkyl boranes, triisobutyl borane seems to be preferable. The employment of solutions of the alkyl boranes in inert solvents, such as the usual hydrocarbon solvents, decreases the safety hazards. If proper care is exercised, there is no reason that the alkyl boranes cannot be used as is.

The hydroperoxide co-catalyst of the ROOH type may be hydrogen peroxide, methyl hydroperoxide, ethyl hydroperoxide, propyl hydroperoxide, butyl hydroperoxide, cumene hydroperoxide, or other alkyl hydroperoxides.

The shortstopping agents used in the process of this invention are those borohydrides having the following structural formula:

wherein X is an alkali metal and wherein each of R, R' and R" may be hydrogen, phenyl, an alkyl group containing from 1 to 10 carbon atoms or an alkoxy radical containing from 1 to 10 carbon atoms. Suitable shortstops having said formula are, for example, sodium borohydride, potassium borohydride, lithium borohydride, sodium trimethoxyborohydride, lithium trimethoxyborohydride, sodium diethoxyborohydride, sodium tributoxyborohydride, potassium tripentoxyborohydride, sodium trimethylborohydride, sodium triethyl borohydride, potassium trimethyl borohydride, sodium triphenyl borohydride, potassium triphenyl borohydride and the like.

The amount of borohydride normally employed to stop a polymerization reaction will be greater than $\frac{1}{10}$ the amount of the catalyst: co-catalyst charged to the reactor, usually as a molar amount about equivalent to the catalyst: co-catalyst remaining in the polymerization mixture at the time of the short-stop. Usually about 0.01 part per 100 parts of monomers will be used, as 0.01 to 1, up to an excess of that required to stop the polymerization reaction, which is readily determinable by those skilled in the art. A substantial excess of borohydride is normally not necessary but if more than the normal amount is accidentally added, it will do no harm since it is not necessary to remove the shortstopping agent from the resin or polymer. However, it is preferable to add the minimum amount of the shortstopping agent necessary to stop the reaction since, when desiring to reinitiate the reaction, it reduces the amount of co-catalyst needed therefor. One skilled in the art can readily determine the amount of short-stop needed for any polymerization recipe to stop the reaction at any desired point. The borohydride may be added to the polymerization mixture as such or in an aqueous solution. However, it has been found to be more convenient to add the borohydride as an aqueous solution.

One major advantage of the use of borohydrides as shortstopping agents in vinylidene monomer polymerization reactions, as described herein, is that when it is desired to stop the reaction only temporarily, the polymerization reaction can thereafter be reinitiated by the addition of more hydroperoxide only. This is also advantageous since when it is desired to recover unused vinylidene monomer and recycle it to the reactor, the presence of borohydride in the monomer has no detrimental effect on subsequent polymerization when further hydroperoxide is added. This phenomenon of reinitiation leads one to believe that the borohydride probably reacts only with the hydroperoxide or the intermediate reaction products of the alkyl borane and hydroperoxide, or alkyl borane and oxygen. At any rate, upon the addition of the borohydride to the polymerization reaction mixture, the reaction stops almost immediately.

In the specific examples, which follow hereinafter, the polymers were prepared in a liquid reaction medium in which the alkyl borane catalyst: co-catalyst system is highly effective. The liquid reaction medium or media are generically called aqueous reaction media which comprise water alone or intimate admixtures of water with one or more organic solvents such as the alcohols including methyl, ethyl, propyl, butyl, amyl, hexyl, heptyl, octyl, methyl hexyl, dimethyl hexyl, and other alcohols, including the polyhydric alcohols, such as glycol, glycerol, and the like, an alkyl nitrile, such as acetonitrile, ethylene cyanohydrin, and the like; the ethers, such as methyl, ethyl, propyl, butyl and higher ethers, and the like; the ketones, such as acetone, methyl ethyl ketone, cyclohexanone, and the like.

It is advantageous, although not essential, to add to the liquid reaction media a small amount of a dispersant in order to obtain a more complete and uniform dispersal of the vinylidene monomer(s) and catalyst: co-catalyst system throughout the reaction media prior to and during the polymerization of the vinylidene monomer(s). Any of the well known dispersants operative in aqueous media may be employed. These include, among others, methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetate, etc.

In the examples, the same general procedure was followed in each case. The materials, that is monomer or monomers, reaction medium, dispersant, catalyst and co-catalyst, are charged into the polymerization chamber, which may be any of the polymerization receptacles commonly used for such reactions, said chamber having been first purged with nitrogen to remove all traces of air. The materials are added to the polymerization receptacle in the following order: first, the components of the reaction medium, such as water, organic solvent, and the dispersant (the reaction medium and dispersant may be admixed before charging); then the monomer, or monomers, to be polymerized; the alkyl borane catalyst; and last, the ROOH co-catalyst. The polymerization receptacle is placed in a suitable bath which is maintained at a predetermined temperature throughout the polymerization. The polymerization receptacle is equipped with a cap having a hypodermic syringe extending therethrough. The shortstopping agent, or borohydride, is added to the reaction mixture through the syringe.

The following specific examples are given by way of illustration of the invention and are not intended to be limitative. In the examples all parts and percentages are by weight unless otherwise indicated.

Example I

Following the procedure given above, a polymerization vessel was charged with

Monomer, vinyl chloride, gm. _____ 857
Reaction medium, water, ml. _____ 1350
Dispersant, 1% solution of methyl cellulose in water, ml. _____ 172
Catalyst, heptane solution of triethyl borane, (18.3% by wt.) ml. _____ 2.74
Co-catalyst, 3% water solution of hydrogen peroxide, ml. _____ 2.0

The polymerization vessel was equipped with an agitator or stirrer and maintained at a temperature of 40° C. by the use of a water bath. There was then prepared a basic water solution of sodium trimethoxy borohydride by adding portionwise 0.6322 gm. of sodium trimethoxy borohydride to about 8 ml. of basic water (1 drop of 50% NaOH in 15 ml. $H_2O$). After the polymerization reaction had proceeded for a period of 3 hours and 30 minutes, with a conversion of monomer to polymer of 30%, 4.0 ml. to the reaction mixture or 2.5 mM. of $NaBH(OCH_3)_3$. of the sodium trimethoxy borohydride solution was added Within 3 to 6 minutes the reaction had stopped completely. The reaction was then reinitiated by the addition to the reaction mixture of more co-catalyst hydrogen peroxide and continued to completion.

Example II

Following the same procedure as in Example I, a polymerization vessel was charged with

| | |
|---|---|
| Monomer, vinyl chloride, grams | 857 |
| Reaction medium, water, ml. | 1800 |
| Dispersant, 1% solution of Elvanol 50–42 * in water, ml. | 172 |
| Catalyst, heptane solution of triethyl borane, ml.** | 2.62 |
| Co-catalyst, 3% water solution of hydrogen peroxide, ml. | 2.0 |

*Hydrolyzed polyvinyl acetate.
**3.97 gms. of Et$_3$B in 17.02 gms. heptane.

The polymerization reaction was run at a temperature of 40° C. There was then prepared a basic water solution of sodium borohydride by adding portionwise 1.0 gm. of sodium borohydride to 10.0 ml. of basic water (1 drop of 50% NaOH in 15 ml. H$_2$O). After the reaction had proceeded for a period of 4 hours and 30 minutes, with a conversion of monomer to polymer of about 64%, 0.4 ml. of the sodium borohydride solution was added to the reaction mixture or 1.0 mM. of NaBH$_4$. Within 3 to 6 minutes the reaction had stopped completely. Again, as in Example I, the reaction was reinitiated by the addition to the reaction mixture of more co-catalyst hydrogen peroxide and continued to completion.

Example III

Following the same procedure as in Example I, a polymerization vessel was charged with

| | |
|---|---|
| Monomer, methyl methacrylate, gms. | 376 |
| Reaction medium, water, ml. | 1800 |
| Dispersant, polyacrylic acid, gms. | 0.4 |
| Catalyst, ethanol solution of triisobutyl borane (10% by volume), ml. | 5.0 |
| Co-catalyst, 3% water solution of hydrogen peroxide, ml. | 4.0 |

The polymerization reaction was run at a temperature of 40° C. An aqueous solution of sodium borohydride was then prepared by dissolving 1.41 grams of sodium borohydride in sufficient basic water (2 drops of 50% NaOH in 25 ml. H$_2$O) to give 25 ml. of sodium borohydride solution. After the polymerization reaction had proceeded for a period of about 5 hours, with a conversion of monomer to polymer of about 59%, 5.0 ml. of the sodium borohydride solution, or 7.5 mM. of NaBH$_4$, was added to the reaction mixture. Within 3 to 6 minutes the polymerization reaction had stopped completely. Again, as in the previous examples, the polymerization reaction was reinitiated by the addition to the reaction mixture of more co-catalyst hydrogen peroxide.

Example IV

Following the procedure given in Example I, a polymerization vessel was charged with

| | |
|---|---|
| Monomer, vinyl chloride, gms. | 150 |
| Reaction medium, water, ml. | 450 |
| Dispersant, 1% solution of Elvanol 50–42 * in water, ml. | 22.5 |
| n-Butane, ml. | 4.0 |
| Catalyst, ethanol solution of tributyl borane (5% by volume), ml. | 2.0 |
| Co-catalyst, oxygen, ml. | 12.5 |

*Hydrolyzed polyvinyl acetate.

The polymerization reaction was run at a temperature of 50° C. An aqueous solution of potassium borohydride was then prepared by dissolving 1.51 grams of potassium borohydride in sufficient basic water (1 drop of 50% NaOH in 15 ml. H$_2$O) to give 25 grams of solution (6% by weight). After the polymerization reaction had proceeded for a period of about 5.5 hours, with a conversion of monomer to polymer of about 46%, sufficient potassium borohydride solution, to give 0.84 mM. of KBH$_4$, was added to the reaction mixture. The polymerization reaction had stopped completely within 3 to 6 minutes after the addition of the potassium borohydride solution. After stopping, the polymerization reaction was reinitiated by the addition of hydrogen peroxide.

Some of the advantages of using the borohydrides as shortstopping agents have been pointed out hereinbefore. However, the consequences of this invention are far-reaching. For example, in the event of a power failure during production of the polymer, the short-stop can be added to terminate the polymerization thus eliminating possible "run-away" reactions along with potentially hazardous results. Also, a major advantage of the borohydrides is the fact that their use as shortstops in the herein described polymerization systems does not lead to formation of toxic or hazardous by-products or other products necessitating their removal from the polymer or recovered monomers.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. The method of stopping the polymerization of vinylidene monomers, having a terminal CH$_2$=C< grouping, in the pressure of an alkyl borane catalyst and hydroperoxide or oxygen co-catalyst comprising adding to a mixture containing vinylidene monomer and an alkyl borane catalyst and hydroperoxide or oxygen co-catalyst a borohydride having the formula

wherein X is an alkali metal and each of R, R' and R'' are selected from the group consisting of hydrogen, phenyl, alkyl groups containing from 1 to 10 carbon atoms, and an alkoxy radical containing from 1 to 10 carbon atoms.

2. The method of claim 1 wherein the borohydride is sodium borohydride.

3. The method of claim 1 wherein the borohydride is sodium trimethoxy borohydride.

4. The method of claim 1 wherein the borohydride is potassium borohydride.

5. The method of claim 1 wherein the vinylidene monomer is a vinyl halide.

6. The method of claim 1 wherein the vinylidene monomer is methyl methacrylate.

7. The method of claim 1 wherein the vinylidene monomer is vinyl chloride.

8. The method of claim 5 wherein the vinyl halide is vinyl chloride and the catalyst is triethyl borane and the co-catalyst is hydrogen peroxide.

9. The method of claim 7 wherein the borohydride is sodium borohydride.

10. The method of claim 7 wherein the borohydride is sodium trimethoxy borohydride.

11. The method of claim 7 wherein the co-catalyst is oxygen.

References Cited

UNITED STATES PATENTS

| | | | |
|---|---|---|---|
| 2,963,459 | 12/1960 | Nicholson et al. | 260—85.5 L |
| 2,985,633 | 5/1961 | Welch | 260—85.5 N |
| 3,092,613 | 6/1963 | Kennerly et al. | 260—85.5 L |
| 3,153,024 | 10/1964 | Thompson et al. | 260—85.5 L |
| 3,169,947 | 2/1965 | Stroh et al. | 260—85.5 N |

OTHER REFERENCES

Bogdanov et al., Chem. Abs. 75 (1971), p. 88666d.

HARRY WONG, JR., Primary Examiner

U.S. Cl. X.R.

260—63 R, 78.5 R, 85.5 L, 88.3 R, 88.7 E, 89.1, 89.7 R, 91.1 R, 91.1 M, 91.5, 91.7, 92,3, 92.8 R, 93.5 R, 94.2 R

UNITED STATES PATENT OFFICE
CERTIFICATE OF CORRECTION

Patent No. 3,769,268  Dated October 30, 1973

Inventor(s) PAUL J. GEORGE

It is certified that error appears in the above-identified patent and that said Letters Patent are hereby corrected as shown below:

Column 6, Claim 1, line 37, change "pressure" to ---presence---.

Signed and sealed this 11th day of June 1974.

(SEAL)
Attest:

EDWARD M. FLETCHER, JR.
Attesting Officer

C. MARSHALL DANN
Commissioner of Patents